Jan. 10, 1928. N. SLOBOTKIN Re. 16,847

SADIRON

Original Filed March 8, 1924

INVENTOR.
Nathan Slobotkin
BY Ernest D. Janssen
ATTORNEYS.

Reissued Jan. 10, 1928. Re. 16,847

UNITED STATES PATENT OFFICE.

NATHON SLOBOTKIN, OF BROOKLYN, NEW YORK.

SADIRON.

Original No. 1,548,957, dated August 11, 1925, Serial No. 697,930, filed March 8, 1924. Application for reissue filed December 9, 1926. Serial No. 153,711.

This invention relates to sad-irons such as are used in tailor shops and clothing manufactures for the pressing of garments, and more particularly to the class of irons which have incorporated therein a heating element, a water vaporizing chamber, and ports adapted to discharge the vapor generated in said chamber through the working face of the iron onto the goods.

The object of this invention is to improve the construction and operation of such irons by providing means whereby the water vapor delivered to the usual discharge ports may be controlled and quickly varied at will.

Figure 1:
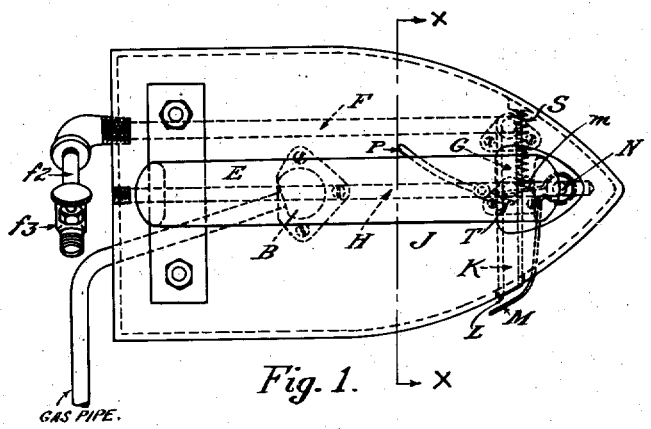
Figure 2:
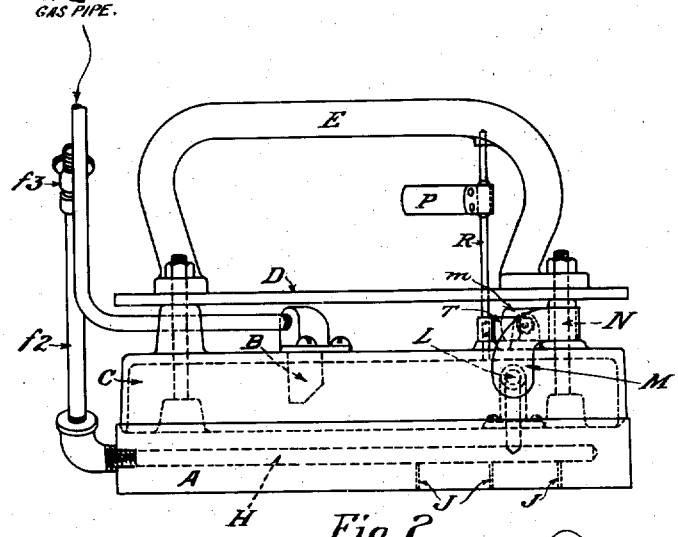
Figure 3:
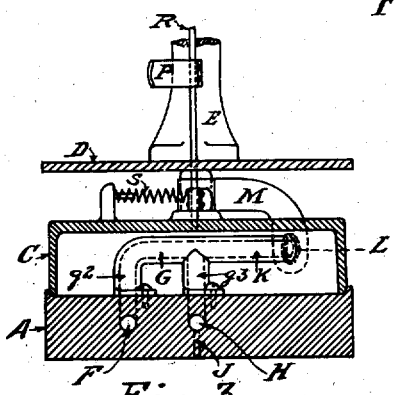
Figure 4:
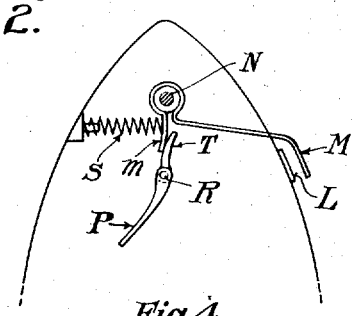

The manner in which I accomplish my object is illustrated in the accompanying drawings, in which Fig. 1 is a plan view of my improved iron, Fig. 2 is a side elevation, Fig. 3 a cross section along the line $x$—$x$ on Fig. 1, and Fig. 4 is a detail plan view of the shutter M and its actuating mechanism.

The same reference characters refer to the same parts throughout the several views.

In the drawings, A represents the base or shoe of the iron, C the shell like cover or combustion chamber, B a burner mounted therein, D a guard plate or deflector, and E the handle.

Formed in the base A is a horizontal longitudinal water vaporizing chamber F, adapted to receive water in suitable quantities delivered through a pipe $f^2$ preferably provided with an inlet valve $f^3$ adapted to be connected by a suitable flexible connection, as, for instance, by a rubber tube, to a source of supply. When the iron is in use the base becomes heated, due to the action of the heating element here illustrated as a usual type of gas burner, and water admitted in proper quantities to the chamber F will be vaporized by coming into contact with the heated metal. A cross port G connects the forward end of the chamber F with a longitudinal horizontal distributing chamber H, which is provided with a number of outlets or ports J, J, opening through the bottom or working face of the iron.

In so far as I have now described my improved iron it does not differ materially from similar irons now on the market, but in these irons the amount of water vapor delivered to the ports J, J, can be controlled only by manipulation of the inlet valve.

When pressing garments it is often advisable to vary the amount of water vapor delivered through the working face of the iron, and at times to stop the delivery temporarily, and with the present types of irons this is not a simple matter, especially when the variation in the flow or the stoppage thereof is to be made quickly and for a short time only. In practice it has been found that the adjustment of the inlet valve so as to give the most satisfactory volume of vapor, is a delicate operation due to the limited amount of water which is normally required; that after the valve is closed there is an appreciable lapse of time before the delivery of vapor will cease, and that it is impracticable to temporarily vary the amount of vapor delivered by adjusting the inlet valve.

The particular object of this invention is to overcome the deficiencies in the present types of such irons by providing means whereby the amount of water vapor delivered to the distributing chamber may be easily and quickly varied, or entirely cut off, without disturbing in any way the flow of water to the vaporizing chamber, or in any way disturbing the rate at which the same will be vaporized.

In my improved iron, illustrated, the cross port G, connecting the vaporizing chamber F to the distributing chamber H lies at a higher level than that of the chambers F and H.

In the model illustrated the port G lies entirely outside of or above the base A, being formed in a fitting attached to the body and extended as at K so as to form an outlet L open to atmosphere. Those parts of the ports which are in this model formed in a fitting attached to the body proper may be formed in the body proper if so desired. Pivotally mounted at some suitable point, as at N, is a swinging shutter M, adapted to close the port L but preferably normally held in open position by means of a spring S. Convenient means are provided whereby the shutter M may be easily and quickly swung into closed position simply by pressure of the operator's thumb upon a conveniently located handle or lever. These means are here illustrated as a conveniently located handle P, fastened on a vertical shaft R, near the bottom of which is fastened a tongue or arm T, adapted to contact with the arm $m$ of the shutter M, so as to actuate the shutter and close it against the tension of the spring S.

Refer now to Fig. 3. It is a well known fact that water vapor tends to rise, and while the port L is open the vapor generated in the chamber F will naturally rise through vertical port $g^2$ and following the upper wall of the port G and the extension K will be discharged through the port L into atmosphere. If now the shutter M is actuated to close the port L, the vapor not being able to escape therethrough will be forced down the vertical port $g^3$, into the distributing chamber H and out of the ports J, J. By partially closing the port L, as by not firmly seating the shutter M, a part of the vapor may be allowed to escape at that point and a part only be forced into the chamber H. This may also be accomplished by intermittently opening and closing the shutter. The ports $g^2$ and $g^3$ together with the cross port G provide a water-flow checking means, which permits the vapors to freely pass to the distributing chamber but which restrains the flow of water to the distributing chamber.

The proper adjustment of the inlet valve $f^3$ having once been accomplished, the portion of the vapor generated which is to be delivered through the ports J may be regulated by simply pressing on the handle P, so as to close, or only partly close the shutter M.

I claim:

1. In a sad-iron, a solid base having a vaporizing chamber and a distributing chamber spaced laterally from and communicating with the vaporizing chamber, said vaporizing chamber having a water inlet thereto, said distributing chamber having discharge openings through the working face of the iron, means for checking the flow of water to said discharge openings while permitting the free passage of vapor therethrough, and heating means for vaporizing the water in the vaporizing chamber and at the same time heating any vapor in the distributing chamber.

2. In a sad-iron, a body having separate vaporizing and distributing chambers, a water inlet to said vaporizing chamber and a series of discharge openings from said distributing chamber through the working face of the iron, a heat generating element adapted to heat the iron and to vaporize water introduced into the vaporizing chamber, said sad-iron having a cross port leading from the vaporizing chamber and discharging to atmosphere and also connecting with the distributing chamber, and means normally in inoperative position for closing the discharge end of said cross port at will.

3. In a sad-iron, a body having separate vaporizing and distributing chambers, a controlled water inlet to said vaporizing chamber and a series of discharge openings from said distributing chamber through the working face of the iron, a heat generating element adapted to heat the iron and to vaporize water introduced into the vaporizing chamber, a cross port leading from the vaporizing chamber and discharging to atmosphere and also connecting into the top of the distributing chamber, and means, normally in inoperative position, for closing the discharge end of said cross port at will.

4. In a sad-iron, a body having a vaporizing chamber with a water inlet thereto, a distributing chamber with a series of ports therefrom opening through the working face of the iron, a cross port lying above but opening into the top of both the said chambers the discharge end of said cross port opening to atmosphere, means operable by pressure of a digit on the hand operating the iron whereby the discharge end of said cross port may be closed at will, and a heat generating element adapted to heat the iron and vaporize water introduced into said vaporizing chamber.

5. In a sad-iron, a vaporizing chamber with a water inlet thereto, a heat generating element adapted to heat the iron and to vaporize water introduced into said vaporizing chamber, a cross port leading from said vaporizing chamber to atmosphere and normally discharging the vapor generated in said vaporizing chamber; a distributing chamber connected into the bottom of said cross port and having a series of discharge ports opening through the working face of the iron, and means for obstructing the free flow of vapor from the discharge port at will.

6. A sadiron comprising a solid base, and a separate upper part mounted on the base and having a combustion chamber therein, said solid base having therein below said combustion chamber, a vaporizing chamber extending longitudinally of the solid base toward one lateral edge thereof and having a distributing chamber extending longitudinally of the solid base and spaced from the vaporizing chamber toward the opposite lateral edge of the solid base, said vaporizing chamber having a water inlet thereto, said distributing chamber having discharge openings through the working face of the iron, said vaporizing and distributing chambers having a connecting passage disposed to check the flow of water to said discharge openings while permitting the free passage of vapor therethrough, said connecting passage communicating with the upper portion only of the vaporizing chamber.

NATHON SLOBOTKIN.